(12) United States Patent
Maruyama et al.

(10) Patent No.: US 7,936,652 B2
(45) Date of Patent: May 3, 2011

(54) OPTICAL DISC APPARATUS

(75) Inventors: Hideki Maruyama, Yokohama (JP); Takeshi Ogata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 12/199,832

(22) Filed: Aug. 28, 2008

(65) Prior Publication Data

US 2009/0086593 A1    Apr. 2, 2009

(30) Foreign Application Priority Data

Sep. 27, 2007   (JP) ................................ 2007-251977

(51) Int. Cl.
*G11B 7/00* (2006.01)
(52) U.S. Cl. .................................. 369/53.19; 369/53.31
(58) Field of Classification Search ............... 369/53.19, 369/44.32, 53.31, 53.35, 53.36
See application file for complete search history.

(56) References Cited

U.S. PATENT DOCUMENTS

| | | | | |
|---|---|---|---|---|
| 6,430,130 B1 * | 8/2002 | Furukawa | ................... | 369/53.19 |
| 6,587,409 B1 * | 7/2003 | Yamazaki et al. | ......... | 369/53.19 |
| 6,690,632 B1 * | 2/2004 | Sato et al. | ................... | 369/53.19 |
| 2004/0085868 A1 * | 5/2004 | Ohno et al. | ................ | 369/44.32 |
| 2005/0162998 A1 * | 7/2005 | Iwasaki et al. | ............. | 369/44.32 |
| 2008/0205233 A1 * | 8/2008 | Chin | .............................. | 369/94 |

FOREIGN PATENT DOCUMENTS

| | | |
|---|---|---|
| JP | 2005-071479 | 3/2005 |
| JP | 2007-251977 | 3/2005 |

* cited by examiner

*Primary Examiner* — Thang V Tran
(74) *Attorney, Agent, or Firm* — Antonelli, Terry, Stout & Kraus, LLP.

(57) ABSTRACT

For achieving an improvement on recording/reproducing quality of information, with enabling more adequate tilt adjustment, even for an optical disc to be used under a circumstance having a large temperature change, an optical disc apparatus for conducting recording or reproducing of video information onto/from the optical disc 2, through buffers 17 and 18, while conducting a tilt adjustment through a learning of a tilt amount, comprises a temperature sensor 4 for detecting temperature within an optical pickup 1, wherein a control unit determines whether a relearning of the tilt amount of the optical pickup, upon basis of a change of temperature detected, a movement amount of the optical pickup between the time when a previous learning is done and the time when a present learning is done, and a remaining memory capacity of the buffers.

5 Claims, 7 Drawing Sheets

FIG. 7(a)

REMAINING BUFFER: SMALL

|  | TEMPERATURE CHANGE: SMALL | TEMPERATURE CHANGE: MIDDLE | TEMPERATURE CHANGE: LARGE |
|---|---|---|---|
| POSITION CHANGE: SMALL | × | × | ○ |
| POSITION CHANGE: MIDDLE | × | × | ○ |
| POSITION CHANGE: LARGE | ○ | ○ | ○ |

FIG. 7(b)

REMAINING BUFFER: MIDDLE

|  | TEMPERATURE CHANGE: SMALL | TEMPERATURE CHANGE: MIDDLE | TEMPERATURE CHANGE: LARGE |
|---|---|---|---|
| POSITION CHANGE: SMALL | × | × | ○ |
| POSITION CHANGE: MIDDLE | × | ○ | ○ |
| POSITION CHANGE: LARGE | ○ | ○ | ○ |

FIG. 7(c)

REMAINING BUFFER: LARGE

|  | TEMPERATURE CHANGE: SMALL | TEMPERATURE CHANGE: MIDDLE | TEMPERATURE CHANGE: LARGE |
|---|---|---|---|
| POSITION CHANGE: SMALL | × | ○ | ○ |
| POSITION CHANGE: MIDDLE | ○ | ○ | ○ |
| POSITION CHANGE: LARGE | ○ | ○ | ○ |

OPTICAL DISC APPARATUS

BACKGROUND OF THE INVENTION

The present invention relates to an optical disc apparatus, to be used under the circumstances of large temperature changes, such as, an optical disc apparatus having a camera as a unit (e.g., a camcorder), a built-in type drive for a notebook-size personal computer (PC), an AV recorder, etc., for example, and in particular, it relates to a technology for enabling an increase of recording/reproducing quality in spite of use thereof even under such the circumstances of large temperature changes.

In general, with the optical disc apparatus for conducting recording or reproducing of information onto/from an optical disc, i.e., a disc-like information recording medium, it is already known that a tilt adjustment (i.e., an inclination of an optical axis of a laser beam) is conducted upon an optical pickup on the way of recording/reproducing operation thereof, for example, in the following Patent Document 1, for example.

[Patent Document 1] Japanese Patent Laying-Open No. 2005-71479 (2005).

BRIEF SUMMARY OF THE INVENTION

Thus, with the Patent Document 1 mentioned above, detecting either one or both of the rotation information of an optical disc or a motor for driving that optical disc thereon, or/and the temperature information within that apparatus, an inclination of an optical axis of a laser beam is controlled (i.e., a tilt adjustment) upon basis of a result of that detection.

However, in general, the optical disc is made up with a substrate layer, a recording film, a protection layer, etc., and the disc generates a tilt angle in a radius direction thereof, such as, a cup-like shape, for example, when temperature change is applied onto the disc, due to the difference of a coefficient of thermal expansion between the substrate layer and the protection layer thereof. An amount of this tilt changes depending on the radius position, and the tilt amount changed due to the temperature change differs depending on the radius position.

Also, since a pattern of changing the tilt amount differs from, such as, the materials of the substrate layer and the protection layer, and also a manufacturing manner of the disc, therefore it is difficult to grasp this changing pattern, correctly. And, in recent years, such change of the tilt amount shows a tendency to appear easily, in particular, on the disc having a large difference between the substrate layer and the protection layer thereof, such as, a BD (Blu-ray) disc, which is widely used due to the large recording capacity thereof, etc.

For that reason, with a linear interpolation in the radial direction to be conducted when acknowledging the disc and/or a tilt learning depending on temperature change during the recording/reproducing operation, it is impossible to follow the change of tilt amount on such the BD. Also, in particular, on a multi-layer BD, it is expected that the change of tilt amount will be further intensified together with that temperature change.

Also, in particular, within a camcorder are heat generating sources, such as, a codec IC, an image pickup device, etc., other than the recording drive, and therefore there is a possibility of generating a large discrepancy between the temperature measured within the drive and the actual temperature of the optical disc. And, because of the temperature of an external device or element, there is also a possibility that, only the layer is heated on one side of the disc and thereby to generate the tilt change, being larger than that caused due to the normal temperature change.

Then, according to the present invention, accomplished by taking the problems with the conventional art mentioned above into the consideration thereof, in particular, an object thereof is to provide an optical disc apparatus, for enabling to conduct an optimal tilt adjustment, upon also the optical disc to be used under the circumstances of a large temperature change, and the pattern of changing the tilt amount thereof is difficult to grasp, and thereby achieving an increase on the recording/reproducing quality of information.

For accomplishing the object mentioned above, according to the present invention, first of all, there is provided an optical disc apparatus, for recording or reproducing video information onto/from an optical disc, by irradiating a laser beam upon said optical disc while rotationally driving said optical disc, comprising: an optical pickup, which is configured to irradiate the laser beam upon said optical disc; a tilt adjustment unit, which is configured to conduct a tilt adjustment through learning of tilt amount; a buffer; a recording/reproducing unit, which is configured to record or reproduce said video information onto/from said optical disc; and further, a temperature detector, which is configured to detect temperature, wherein it is determined on whether a relearning of tilt amount of said optical pickup should be conducted or not, upon basis of change of the temperature, which is detected by said temperature detector.

Further, according to the present invention, within the optical disc apparatus as described in the above, it may be determined on whether the relearning of tilt amount of said optical pickup should be conducted or not, upon basis of the change of the temperature, which is detected by said temperature detector, in addition thereto, and further a movement amount of said optical pickup, from time when a previous learning is done to time when a present learning is done.

Also, for accomplishing the object mentioned above, according to the present invention, there is also provided an optical disc apparatus, for recording or reproducing video information onto/from an optical disc, by irradiating a laser beam upon said optical disc while rotationally driving said optical disc, comprising: an optical pickup, which is configured to irradiate the laser beam upon said optical disc; a tilt adjustment unit, which is configured to conduct a tilt adjustment through learning of tilt amount; a buffer; and a recording/reproducing unit, which is configured to record or reproduce said video information onto/from said optical disc, wherein it is determined on whether a relearning of tilt amount of said optical pickup should be conducted or not, upon basis of change of the temperature, which is detected by said temperature detector.

Further, according to the present invention, within the optical disc apparatus as described in the above, it may be determined on whether the relearning of tilt amount of said optical pickup should be conducted or not, upon basis of the change of the temperature, which is detected by said temperature detector, in addition thereto, and further a remaining memory capacity of said buffer.

In addition thereto, also for accomplishing the object mentioned above, according to the present invention, there is further provided an optical disc apparatus, for recording or reproducing video information onto/from an optical disc, by irradiating a laser beam upon said optical disc while rotationally driving said optical disc, comprising: an optical pickup, which is configured to irradiate the laser beam upon said optical disc; a tilt adjustment unit, which is configured to conduct a tilt adjustment through learning of tilt amount; a buffer; and a recording/reproducing unit, which is configured to record or reproduce said video information onto/from said optical disc, wherein it is determined on whether a relearning of tilt amount of said optical pickup should be conducted or not, upon basis of a remaining memory capacity of said buffer.

Further, according to the present invention, for accomplishing the object mentioned above, there is also provided an optical disc apparatus, for recording or reproducing video information onto/from an optical disc, by irradiating a laser beam upon said optical disc while rotationally driving said optical disc, comprising: an optical pickup, which is configured to irradiate the laser beam upon said optical disc; a tilt adjustment unit, which is configured to conduct a tilt adjustment through learning of tilt amount; a buffer; a recording/reproducing unit, which is configured to record or reproduce said video information onto/from said optical disc; and further, a temperature detector, which is configured to detect temperature, wherein it is determined on whether a relearning of tilt amount of said optical pickup should be conducted or not, upon basis of change of the temperature, which is detected by said temperature detector, a movement amount of said optical pickup, from time when a previous learning is done to time when a present learning is done, and a remaining memory capacity of said buffer.

And, according to the present invention, within the optical disc apparatus, as described in the above, it is preferable to determine on whether the relearning of tilt amount of said optical pickup should be conducted or not, by using a table of the movement amount of said pickup and the change amount of said temperature, and further it is preferable to prepare a plural number of tables are d, between the movement amount of said optical pickup and the change amount of said temperature, within a remaining memory capacity of said buffer, separately, and thereby conducting the determination on whether the relearning of tilt amount should be conducted or not.

Thus, according to the present invention, it is possible to conduct control responding to those changes of tilting, by conducting the necessary control learning, depending upon the circumstances of the optical disc apparatus, such as, the temperature changes, the recording position changes, and further the remaining memory capacity of the buffer, etc., and thereby maintaining the recording/reproducing of the optical disc.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 7(*a*) to 7(*c*) are views for showing a reference table to be used in the tilt relearning according to the present invention, within the optical disc apparatus (i.e., the camcorder) mentioned above.

DETAILED DESCRIPTION OF THE PREFERRED EMBODIMENTS

Hereinafter, an embodiment according to the present invention will be fully explained by referring to the attached drawings. However, the explanation will be made below, in particular, upon an optical disc apparatus (i.e., a camcorder) having a camera as a unit, as an example of the apparatus for conducting the recording/reproducing operations of information under the circumstance of a large temperature change.

Figure 1:
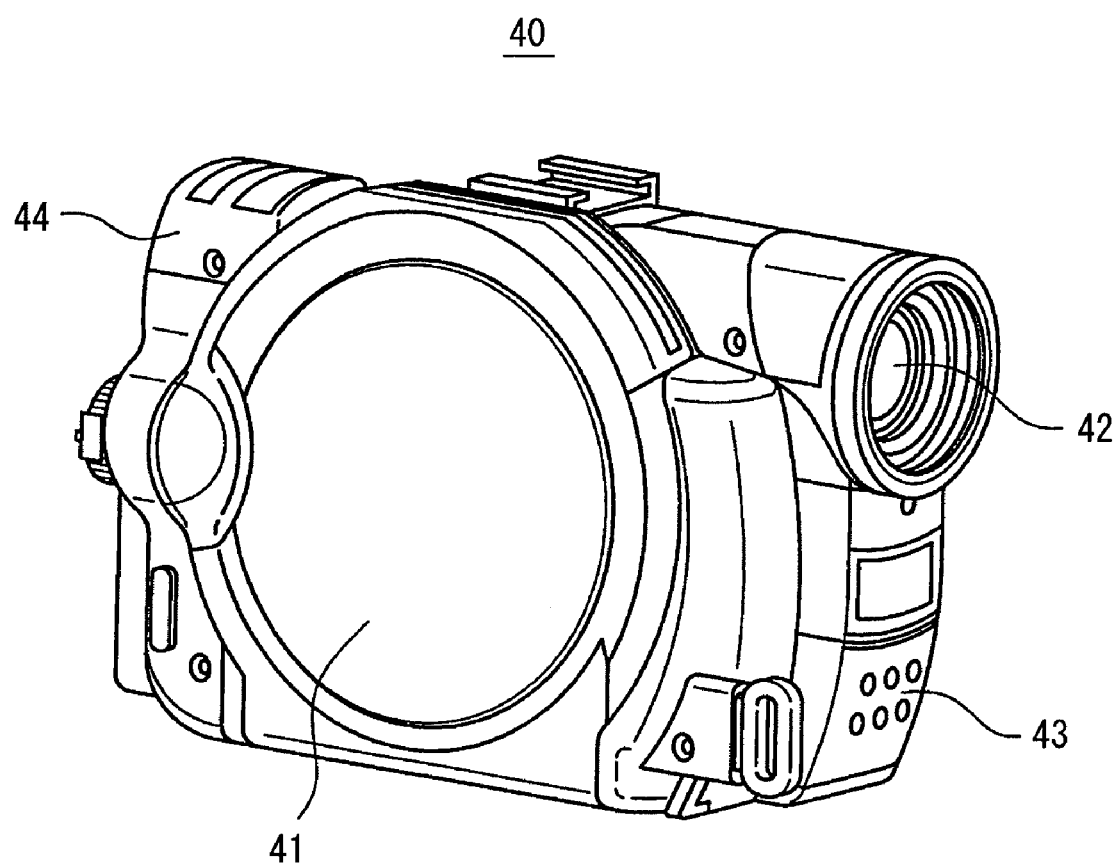
FIG. 1 is a perspective view for showing an entire outlook of an optical disc apparatus, in particular, having a camera as a unit (i.e., a camcorder), according to an embodiment of the present invention.

First of all, FIG. 1 attached herewith shows an outlook view of the camcorder, according to an embodiment of the present invention, wherein a reference numeral 40 depicts a camcorder, 41 an optical disc apparatus, 42 a lens portion, 43 a microphone portion, and 44 a finder portion, respectively. Further, into/from this optical disc apparatus 41, an optical disc (for example, DVD-RAM) is freely detachable, from an outside thereof, and it is easily influenced by an external atmosphere, in particular, the circumferential temperature thereof. Moreover, a video camera to be used in this camcorder applies, such as, a CCD area sensor therein, for example, but the present invention should not be limited to this, and other than that, it may be other solid-state image pickup device, such as, a CMOS (Complementary Metal Oxide Semiconductor) sensor, etc., or an image pickup tube, or further it may be an analog camera or a digital camera, for example.

Figure 2:
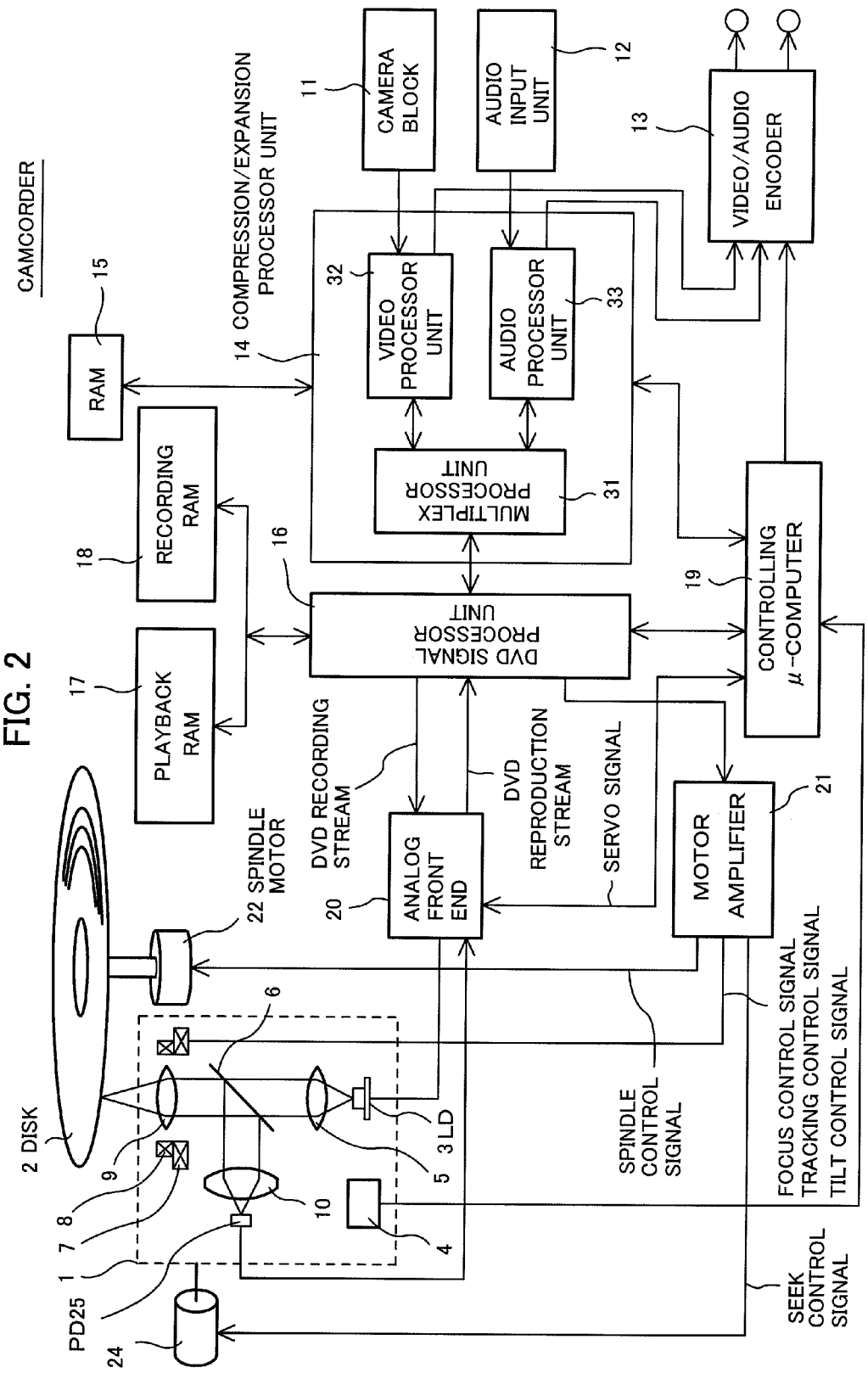
FIG. 2 is a block diagram for showing the internal structures of the optical disc apparatus (i.e., a camcorder) mentioned above.
Figure 3:
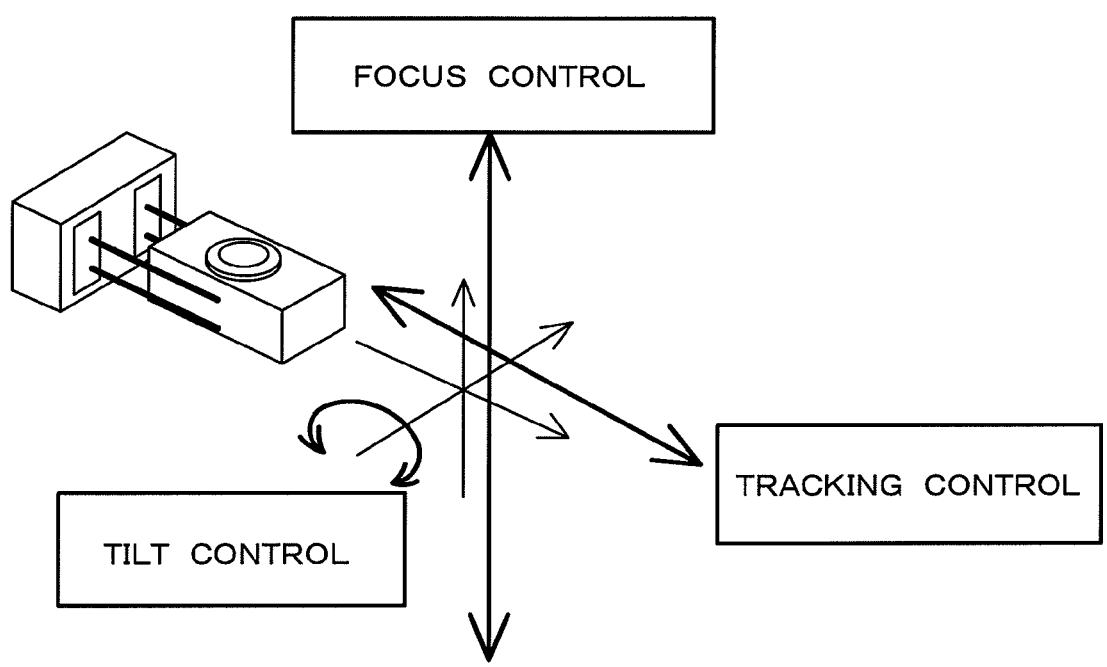
FIG. 3 is a view for explaining a control of an optical head (e.g., a pickup) through an actuator within the optical disc apparatus (i.e., the camcorder) mentioned above.

Next, FIG. 2 attached herewith is a block diagram for showing the internal structures of the camcorder, according to the embodiment of the present invention, wherein a reference numeral 1 depicts an optical head (or, pickup), 2 an optical disc, 3 a laser diode (LD), 4 a temperature sensor, 5 a collimate lens, 6 a beam splitter, 7 a tracking actuator, 8 a focus actuator, 9 an objective lens, 10 a condenser lens, 25 a photo diode for converting a light from the condenser lens 10 into an electric signal, 11 a camera block, 12 an audio input portion, 13 a video/audio encoder, 14 a compression/extension processor portion, 15 a RAM (Random Access Memory), 16 a DVD signal processor portion, 17 a playback RAM, 18 is a recording RAM, 19 a controlling microcomputer, 20 an analog front-end, 21 a motor amplifier, 22 a spindle motor, 24 a seek motor, 31 a multiplexing processor portion, 32 a video processor portion, and 33 an audio processor portion, respectively.

Thus, within the camcorder, the outer look and the internal structures of which are shown in the above, the optical disc apparatus is constructed with the optical head 1, including the temperature sensor 4, the laser diode 3, the focus actuator 8 and the objective lens 9, etc., and further with the optical disc 2, the analog front-end 20, the motor amplifier 21 and the seek motor 24, etc., however in case when considering to be the optical disc apparatus or a laser diode controller apparatus for controlling drive of the laser diode, for example, but not restricting to the camcorder, then the controlling microcomputer 19 and a part of the DVD signal processor portion 16 (i.e., an interface) are also included in the structures thereof. Also, the playback RAM 17 and the recording RAM 18 may be made up with one (1) piece of RAM, and in such the case there can be considered that an inside of RAM is divided into two (2) areas to be used.

Following to the above, in FIG. 2 mentioned above, the camera block 11 comprises a lens, CCD (Charge Coupled Device), a driver circuit and a video signal processor circuit, at least, wherein the CCD driven by the driver circuit converts an optical image, which is obtained through the lens, into the electric signal, and it is adjusted on picture quality thereof, within the video signal processor circuit, to be outputted to the video processor portion 32 of the compression/extension processor portion 14. On the other hand, the audio input portion 12 converts sounds, which are taken from a sound source sensor, such as, the microphone, etc., into an electric signal, to be outputted to the audio processor portion 33 of the compression/extension processor portion 14.

While, the video processor portion 32 mentioned above converts the video inputted into a digital video signal to be outputted to the multiplexing processor portion 31 and the video/audio encoder 13, on the other hand, the audio processor portion 33 mentioned above converts the sounds inputted into a digital audio signal to be outputted to the multiplexing processor portion 31 and the video/audio encoder 13. The video/audio encoder 13 outputs the video data and the audio data inputted, depending on control of the controlling microcomputer. Also, the multiplexing processor portion 31 conducts the multiplexing process upon the video data and the audio data inputted, to be outputted to the DVD signal processor portion 16.

Further, the DVD signal processor portion 16 outputs the video/audio compression data, which is inputted from the multiplexing processor portion 31, to the analog front-end 20, as a DVD recording stream, while memorizing it therein, temporarily, with using the recording RAM 18. And, at the same time, it also outputs a servo signal (i.e., also used when reproducing) to the motor amplifier 21, and thereby controlling writing onto the optical disc 2. However, the playback RAM 17 is used, when reproducing the video/audio data, which is read out from the optical disc 2 and to be outputted from the analog front-end 20 as the DVD reproduction stream, for outputting the video/audio data to the multiplexing processor portion 31, while memorizing it therein, temporality. Also, the analog front-end 20 converts a current pulse from data of the DVD recording stream, which is inputted from the DVD signal processor portion 16, and supplies it to the laser diode 3 of the optical head 1.

Also, the laser diode 3 outputs a laser beam having a power corresponding to a value of current supplied thereto. This laser beam outputted, passing through the collimate lens 5, the beam splitter 6 and the objective lens 9, is irradiated upon a recording layer (or surface) of the optical disc 2; thereby achieving recording (write-in) or reproducing (read-out). In this instance, a part of the laser beam outputted from the laser diode 3 is divided within the beam splitter 6, and further passing through the condenser lens 10, it is irradiated upon the photo diode 25. The photo diode 25 detects an intensity of light incident thereupon, and outputs detected intensity data to the analog front-end 20. The analog front-end 20 determines on whether the present power of the laser beam is adequate or not, from the inputted data of light intensity, and as a result thereof, if it is adequate, the current is supplied as it is, at the setup value thereof; on the other hand, if it is determined to be inadequate, then an exchange rate is changed, for converting the current pulse from the data of DVD recording stream, which is inputted from the DVD signal processor portion 16, and thereby supplying the current. In this instance, the analog front-end 20 and the controlling microcomputer 19 are always accessing data with each other, so as to renew the setup condition corresponding to the condition thereof.

And, the motor amplifier 21 outputs the following control signals (1) to (4), and thereby conducting the following controls (5) to (8).

Thus, the motor amplifier 21 receives the servo signal from the analog front-end 20, through the DVD signal processor portion 16, and upon basis of the servo signal received, it outputs (1) a spindle control signal to the spindle motor 22, (2) a focus control signal to the focus actuator 8, and further (3) a tracking control signal to the tracking actuator 7, and also (4) a seek control signal to the seek motor 24.

Thereafter, (5) the spindle motor 22 rotates the optical disc 2 corresponding to the spindle control signal, (6) the tracking actuator 7 adjusts a fine positional shift in a radial direction (i.e., in direction of the normal line), such as, rolling when the disc rotates, etc., depending on the tracking control signal, for example, (7) the focus actuator changes the focus position of the laser beam irradiated upon the optical disc 2 by moving the objective lens 9 up and down depending on the focus control signal <focus control>, and (8) the seek motor 24 moves the optical head 1 depending on the seek control signal in the radial direction (e.g., direction of the normal line) of the optical disc 2 <tracking control>, and further controls an inclination direction of the optical axis of the laser beam <tilt control>; thereby moving the position, upon which the laser beam is irradiated, to a predetermined position on the recording surface of the optical disc 2.

In this instance, the temperature sensor 4 is provided in the vicinity of the laser diode 3, for example, so as to detect the temperature or the temperature information of the laser diode 3, and it outputs that temperature or temperature information detected to the controlling microcomputer 19. The controlling microcomputer 19 grasps the temperature of the laser diode 3 from the temperature or the temperature information inputted from that temperature sensor 4, and therefore it accesses to the analog front-end 20 depending on the necessity thereof, and thereby changing the exchange rate of the value of current to be supplied to the laser diode 3 or controlling start or stop of supply thereof. However, this controlling microcomputer 19, not only conducting the accesses between the analog front-end, but further conducts accesses among the constituent elements of the camcorder as a whole, thereby keeping the whole of the camcorder in an appropriate condition thereof.

And, according to the present invention, within such the optical disc apparatus as mentioned above, in particular, the tilt adjustment (i.e., relearning of a tilt amount) is determined to be conducted or not, not only when acknowledging the disc or the temperature changes, in normal, but also from the relationship between the present radius position and the previous radial potion and/or the relationship with a buffer remaining capacity, etc., while memorizing the radius position where a previous tilt adjustment was conducted. For example, even if the temperature change does not reach to a threshold value, it is so determined to conduct the tilt adjustment when it is far from the portion where the previous adjustment was made, or when there is a room or margin in the buffer capacity.

First of all, explanation will be made, hereinafter, upon a tilt relearning determination, by referring to a flowchart shown in FIG. 4 attached and a table shown in FIGS. 7(a) to 7(c). However, the operations that will be explained below is conducted by the controlling microcomputer 19 mentioned above, upon basis software memorized in, such as, a memory or the like, in advance.

Thus, according to the present invention, since it is made for accomplishing the object, i.e., an improvement of recording/reproducing quality within the optical disc apparatus to be used under the circumstances of large temperature changes, such as, the camcorder mentioned above, representatively, therefore, determination is made on whether the relearning should be conducted or not, upon the tilt amount, depending on the temperature change and the change of the recording/reproducing position. And, a basic way of thinking lies to combine the learning upon the temperature change and the learning at the present position. Thus, as a total of system, it is preferable to restrict the tilt adjustment during the recording/reproducing operations, judging from the relationship of the buffer capacity for use of recording/reproducing, etc. And, in particular, for an equipment operating upon a battery, since the number of times of learning is equal (=) the consumption of electric power, then it is desirable to limit the number of times of learning as small as possible.

Then, according to the present invention, while producing a pattern depending on the temperature change, the learning is conducted when either one of the temperature change or the change of the recording/reproducing position exceeds a certain level, or a total of both exceeds a certain value, thereby obtaining a sufficient learning effect, while reducing the number of times of the learning.

However, in general, according to the present invention, a learning threshold value is determined as below:

(learning threshold value)≦(constant of temperature change)×(temperature change amount)+(constant of temperature change)×(position change)

Following to the above, the detailed explanation will be given in details thereof, upon the detailed flows of the tilt relearning determination, which will be executed upon basis of the present invention mentioned above.

Embodiment 1

Figure 4:
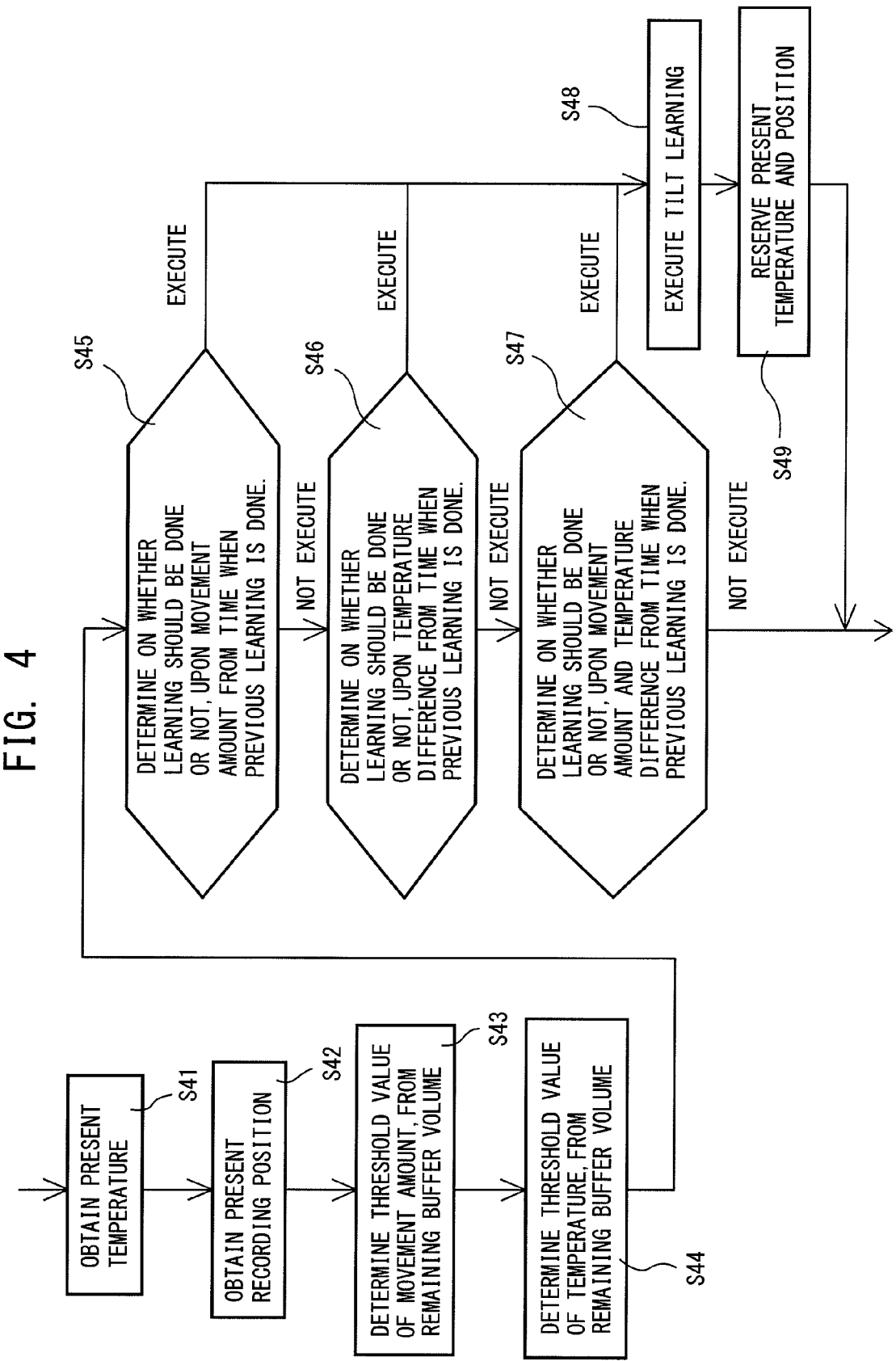
FIG. 4 is a flowchart for showing an embodiment 1 of the function for determining necessity/unnecessity of a tilt relearning according to the present invention, within the optical disc apparatus (i.e., the camcorder) mentioned above.

First of all, in FIG. 4, when the recording process is started, the present temperature is obtained (S41), and further the present recording position is obtained (S42). Following to the above, for example, upon basis of the remaining recording capacity (e.g., remaining buffer amount) within the buffer, such as, the playback RAM 17 or the recording RAM 18, a threshold value is determined for the moving amount (i.e., the difference between the present radial position and the previous radial position) (S43), and further, upon basis of that remaining buffer amount, the temperature (i.e., the difference between the present temperature and the previous temperature) is determined (S44).

And, in a step following the step S44 mentioned above, firstly it is determined on whether the tilt relearning should be conducted or not (S45), by comparing the movement amount from the previous time of learning with the threshold value, which is determined in the step S43 mentioned above. Following to the above, it is determined on whether the tilt relearning should be conducted or not (S46), by comparing the temperature difference at the time when the previous learning is done with the threshold value of temperature, which is determined in the step S44 mentioned above. Further, thereafter, determination is made on whether the tilt relearning should be conducted or not (S47), upon the temperature difference from that at the time when the previous learning is done and the movement amount.

As a result of the above when it is determined that the tilt relearning should be conducted ("Execute"), then the tilt learning is executed (S48), and thereafter the present temperature, which is obtained before, and the present recording position are reserved (S49). On the other hand, when it is determined that the tilt relearning should not be conducted ("Not Execute"), the process is ended as it is, and then it moves to a next process. However, herein, the tilt learning, which should be executed in the step S48 mentioned above, is an ordinary tilt learning process, which is also described in the above-mentioned Patent Document 1 (Japanese Patent Laying-Open No. 2005-71479 (2005)), and since it does not directly related to the present invention, then the explanation of which will be omitted. Also, in the explanation given in the above, though those three (3) steps S45, S46 and S47 are explained to be a series of steps to be conducted; however, with only one of those steps or the steps S45 and S47 or the steps S46 and 47, the similar can be executed. In addition thereto, in the above, the explanation is given only about the example of using the threshold value of temperature; however, with this, it also may be achieved, by only determining on whether the execution should be done or not, upon basis of that remaining buffer volume within the buffer.

Embodiment 2

Figure 5:
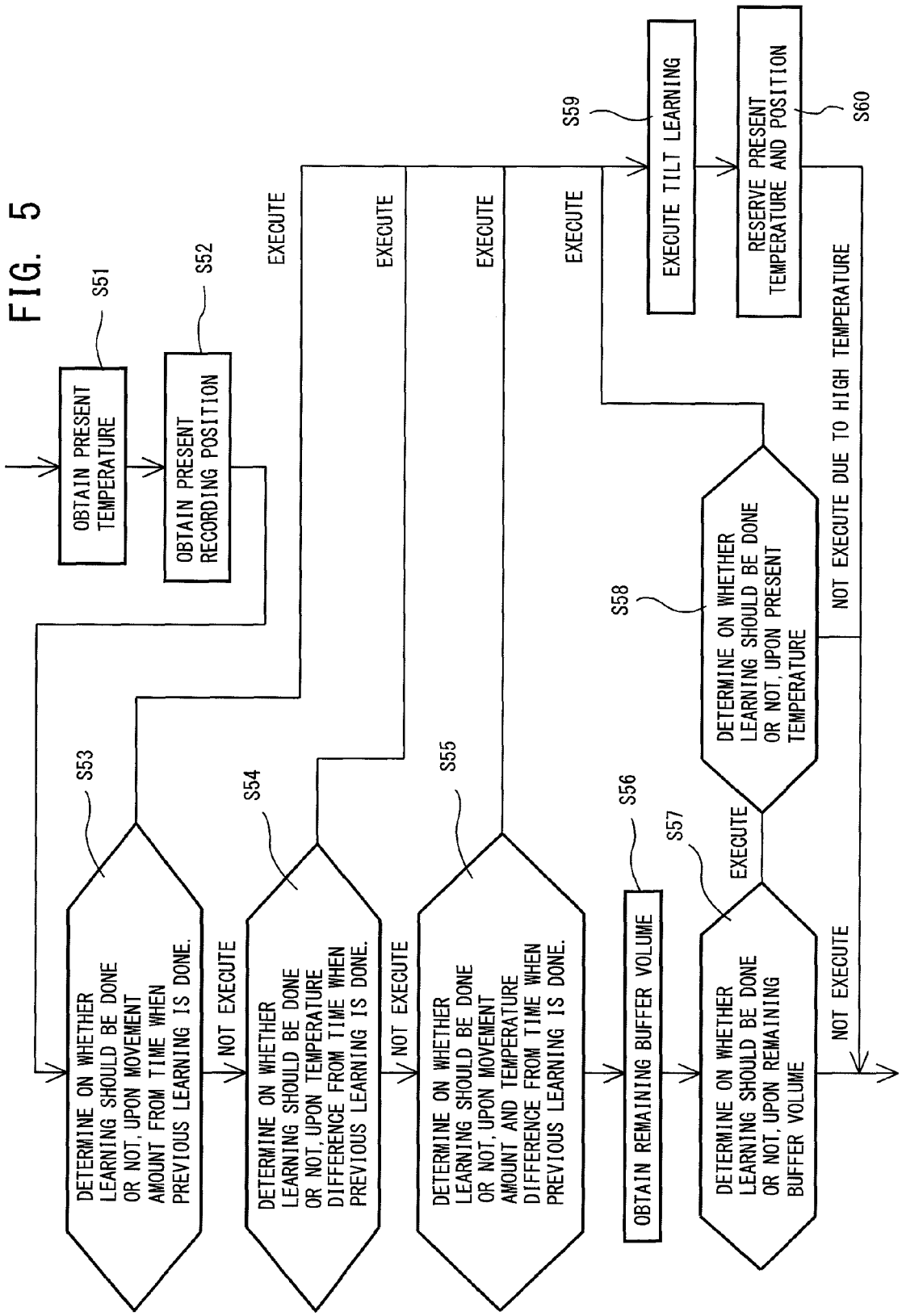
FIG. 5 is a flowchart for showing an embodiment 2 of the function for determining necessity/unnecessity of the tilt relearning according to the present invention, within the optical disc apparatus (i.e., the camcorder) mentioned above.

Next, with a $2^{nd}$ embodiment (embodiment 2) of the present invention, as is shown in FIG. 5 attached herewith, when the recording process is started, the present temperature is obtained (S51), and further, the present recording position is obtained (S52). Following to the above, determination is made on whether the tilt relearning should be executed or not (S53), upon the movement amount from the time when the previous learning is done. However, this determination is conducted by comparing the difference, from the position at the time when the previous learning is done up to the present recording position, which is obtained in the above, to the threshold value mentioned above, for example. Further, determination is made on whether the tilt relearning should be executed or not (S54), upon the temperature difference from that when the previous learning is done, however in this time, it can be also conducted by comparing with the threshold value mentioned above, in the similar manner to the above. Further, upon the temperature difference from that when the previous learning is done and the movement amount, it is determined on whether the tilt relearning should be executed or not (S55).

Thereafter, further, the remaining buffer volume is obtained (S56), and it is determined on whether the tilt relearning should be executed or not (S57), upon that remaining buffer volume obtained. And, as a result thereof, when determination is made "Execute", further determination is made on whether the tilt relearning should be executed or not (S58), upon the present temperature, and as the result thereof when determination is made that the relearning should be "Execute", then the tilt learning is executed (S59). On the other hand, when it is determined that the tilt relearning should not be executed in the step S67 mentioned above, or should not be executed because the temperature is high, then the process ends at it is, and it moves to the next process.

Embodiment 3

Figure 6:
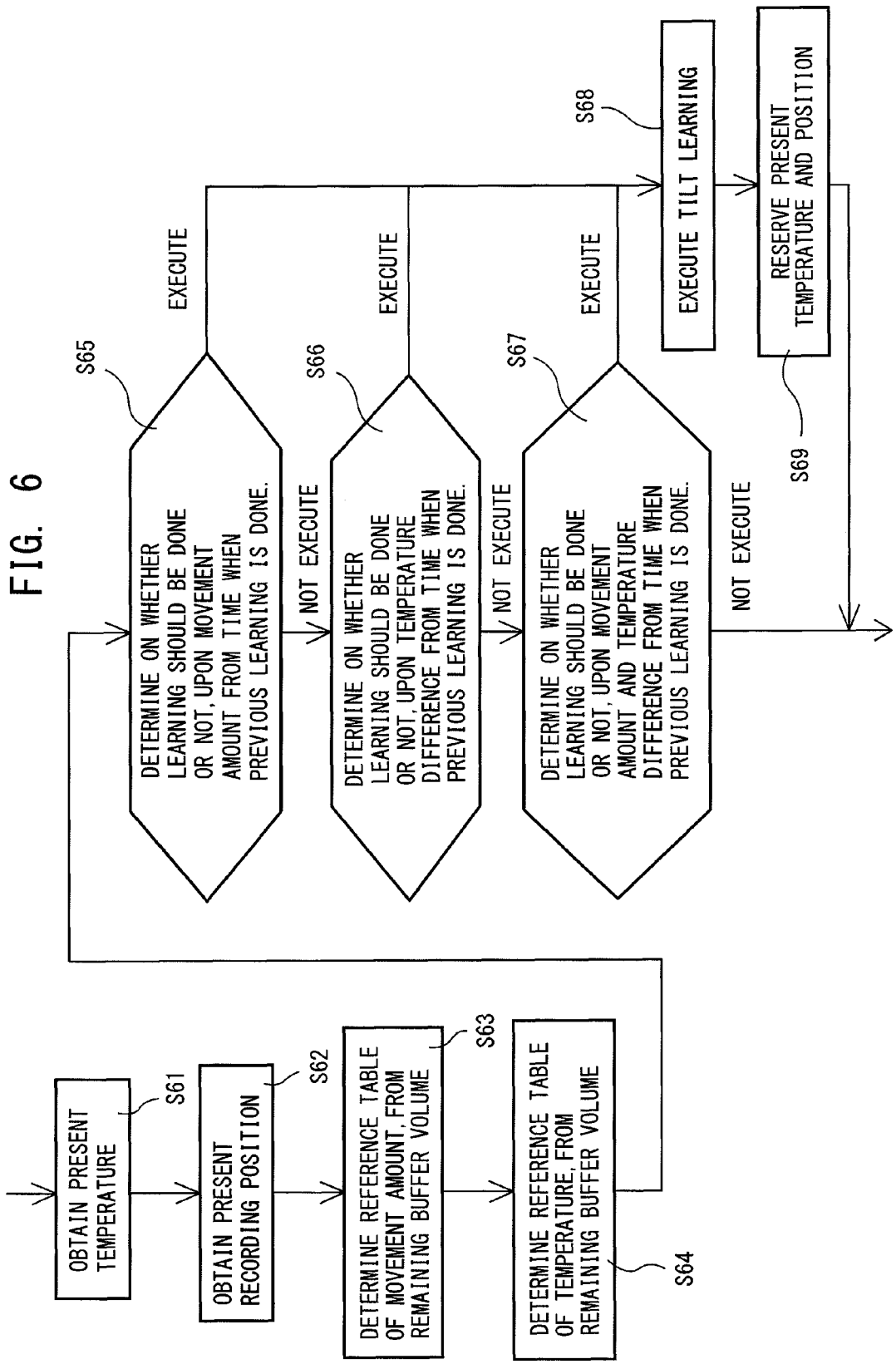
FIG. 6 is a flowchart for showing an embodiment 3 of the function for determining necessity/unnecessity of the tilt relearning according to the present invention, within the optical disc apparatus (i.e., the camcorder) mentioned above.

Following to the above, explanation will be given on the flow for the tilt relearning determination, according to a $3^{rd}$ embodiment (embodiment 3), by referring to FIGS. 6 and 7(*a*) to 7(*c*).

However, also in this embodiment, being similar to the embodiment mentioned above, when the recording process is started, the present temperature is obtained (S61), and further the present recording position is obtained (S62). Following to the above, upon basis of the remaining recording capacity (i.e., the remaining buffer volume) within the buffer, such as, the playback RAM 17 or the recording RAM 18, for example, determination is made on a reference table (S63) for the movement amount (i.e., the difference between the present radial position and the previous radial position), and further, upon basis of that remaining buffer volume, determination is made on a reference table (S64) of the temperature (i.e., the difference between the present temperature and the previous temperature).

However, an example of the reference table, which is determined upon basis of the remaining buffer volume in this time, is shown in FIGS. 7(a) to 7(c). Thus, FIG. 7(a) shows the reference table in case where that remaining buffer volume is small, however in this table, "POSITION CHANGE: SMALL" means that the position change=moving amount (i.e., the difference between the present radial position and the previous radial position) is smaller a predetermined value, "POSITION CHANGE: MIDDLE" means that the position change=moving amount is in a middle degree, and "POSITION CHANGE: LARGE" means that the position change=moving amount is in large, respectively. And, in this table, "X" means that the tilt relearning is not conducted, on the other hand, "○" means that the tilt relearning is conducted. Also, FIG. 7(b) shows the reference table in case where that remaining buffer volume is in a middle degree and FIG. 7(c) shows the reference table in case where that remaining buffer volume is large, respectively.

Thereafter, with using the reference table mentioned above, determination is made on whether the tilt relearning should be executed or not (S65), upon the movement amount from that when the previous learning is done, and thereafter, determination is made on whether the tilt relearning should be executed or not (S66), upon the temperature difference from that when the previous learning is done. Further, determination is made on whether the tilt relearning should be executed or not (S67), upon the temperature change and the movement amount from those when the previous learning is done. As a result thereof, if it is determined that the tilt relearning should be conducted ("EXECUTE"), then the tilt relearning is executed (S68), and thereafter, the present temperature and the present recording position, which are obtained before, are reserved (S49), on the other hand, if it is determined that the tilt relearning should not be conducted ("NOT EXECUTE"), then the process is ended as it is, and it moves to the next process.

However, in the above, within the tilt learning, upon an instruction from the CPU is turned the tracking control of the optical pickup into "OFF", thereby shifting the objective lens of an optical system, compulsively, and detection is made on a signal level corresponding to an amount or intensity of a return light, as tilt information at each shifting position. That tilt information detected is inputted into the CPU, and that CPU obtains the most suitable point or the most suitable range of tilting, upon basis of that tilt information, and thereby determining an amount of tilt adjustment. Namely, the information relating to the inclination of the optical axis of the laser beam (hereinafter, called "tilt information") can be detected by calculating/processing the electric signal from the laser beam receiving portion when it is shifted, while compulsively shifting the objective lens in the optical system (not shown in the figure) of the laser generating portion and the laser receiving portion, within the return-light signal calculation/processing portion mentioned above. And, the CPU controls the tilt adjustment driver portion or unit, upon basis of that tilt information detected.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus for recording or reproducing video information onto/from an optical disc, by irradiating a laser beam upon said optical disc while rotationally driving said optical disc, comprising:

an optical pickup, which is configured to irradiate the laser beam upon said optical disc;

a tilt adjustment unit, which is configured to conduct a tilt adjustment through learning of tilt amount;

a buffer for storing video information to be recorded or reproduced onto or from said optical disc;

a recording/reproducing unit, which is configured to record or reproduce said video information onto/from said optical disc; a temperature detector which is configured to detect temperature; and a control unit which determines whether a relearning of tilt amount of said optical pickup should be conducted or not, upon basis of change of the temperature, which is detected by said temperature detector;

wherein said control unit determines whether the relearning of tilt amount of said optical pickup should be conducted or not, upon basis of the change of the temperature, which is detected by said temperature detector, in addition thereto, and further a remaining memory capacity of said buffer.

2. An optical disc apparatus, for recording or reproducing video information onto/from an optical disc, by irradiating a laser beam upon said optical disc while rotationally driving said optical disc, comprising:

an optical pickup, which is configured to irradiate the laser beam upon said optical disc;

a tilt adjustment unit, which is configured to conduct a tilt adjustment through learning of tilt amount;

a buffer for storing video information to be recorded or reproduced onto or from said optical disc;

a recording/reproducing unit, which is configured to record or reproduce said video information onto/from said optical disc; and a control unit which determines whether a relearning of tilt amount of said optical pickup should be conducted or not, upon basis of a remaining memory capacity of said buffer.

3. An optical disc apparatus, for recording or reproducing video information onto/from an optical disc, by irradiating a laser beam upon said optical disc while rotationally driving said optical disc, comprising:

an optical pickup, which is configured to irradiate the laser beam upon said optical disc;

a tilt adjustment unit, which is configured to conduct a tilt adjustment through learning of tilt amount;

a buffer for storing video information to be recorded or reproduced onto or from said optical disc;

a recording/reproducing unit, which is configured to record or reproduce said video information onto/from said optical disc;

a temperature detector, which is configured to detect temperature and a control unit which determines whether a relearning of tilt amount of said optical pickup should be conducted or not, upon basis of change of the temperature, which is detected by said temperature detector, a movement amount of said optical pickup, from time when a previous learning is done to time when a present learning is done, and a remaining memory capacity of said buffer.

4. The optical disc apparatus, as described in the claim 3, wherein said control unit determines whether the relearning of tilt amount of said optical pickup should be conducted or not, by using a table of the movement amount of said pickup and the change amount of said temperature.

5. The optical disc apparatus, as described in the claim 4, wherein a plural number of tables are prepared, between the movement amount of said optical pickup and the change amount of said temperature, within a remaining memory capacity of said buffer, separately, and thereby said control unit conducts the determination on whether the relearning of tilt amount should be conducted or not.

* * * * *